United States Patent [19]

Johnson et al.

[11] 3,766,327

[45] Oct. 16, 1973

[54] TAPE CASSETTE HOLDING AND POSITIONING UNIT

[76] Inventors: Richard M. Johnson, 3815 Weeburn, Dallas, Tex.; John Jones, 6043 Caracas, Dallas, Tex. 75232

[22] Filed: Sept. 23, 1971

[21] Appl. No.: 189,466

[52] U.S. Cl. .......................... 179/100.2 Z, 274/4 D

[51] Int. Cl. ....................... G11b 15/06, G11b 23/08

[58] Field of Search ............................ 179/100.2 Z; 274/4 C, 4 D

[56] References Cited

UNITED STATES PATENTS

| | | | |
|---|---|---|---|
| 3,601,557 | 8/1971 | Lennox | 179/100.2 Z |
| 3,601,558 | 8/1971 | Sugaya | 179/100.2 Z |
| 3,037,093 | 5/1962 | Nowlan | 179/100.2 Z |

*Primary Examiner*—Bernard Konick
*Assistant Examiner*—Jay P. Lucas
*Attorney*—Giles C. Clegg, Jr. et al.

[57] ABSTRACT

A tape cassette unit includes a frame and a housing movably mounted on the frame for holding the cassette. The housing is movable between an open or loading position for receiving the cas sette and a closed or operating position for enabling recording on and reading from the cassette tape. A recording head is rigidly mounted in the housing so as to engage the cassette tape when the cassette is inserted in the housing. The tape unit also includes a switch for automatically initiating operation of the unit when the housing with the cassette properly positioned therein, is moved into operating position.

6 Claims, 7 Drawing Figures

TAPE CASSETTE HOLDING AND POSITIONING UNIT

BACKGROUND OF THE INVENTION

This invention relates to tape cassette units and more particularly to a mechanism for holding and positioning a tape cassette in the unit.

Tape cassette units have found increasing use as simple, economical, and reliable means of storing data. Such units normally include, among other things, a housing for the cassette, a recording head, and drive spindles over which the cassette spools fit for controlling the cassette tape movement. It is important with such configurations that the cassette be positioned and latched precisely in the tape unit relative to the recording head to provide consistency of alignment of the recording head with the tape from one use of the tape unit to the next.

Prior art mechanisms for positioning the cassette often times provided for inserting the cassette into a housing into which the recording head would be moved after the cassette was latched into place. Because of the movement of the recording head relative to the cassette to achieve an operating position and because of the inevitable wear on the recording head positioning mechanism, misalignment of the recording head with the cassette tape frequently resulted.

SUMMARY OF THE INVENTION

It is an object of the present invention to provide a tape cassette unit having an improved mechanism for locating and positioning the cassette relative to the recording head.

It is another object of the present invention to provide a cassette tape unit requiring few moving parts for positioning the cassette relative to the recording head.

It is still another object of the present invention to provide a tape unit having a movable cassette housing and a recording head in a fixed relationship with the housing.

It is a further object of the present invention to provide a cassette tape unit having a cassette loading and positioning mechanism which facilitates ease of loading and unloading the cassette from the tape unit.

It is also an object of the present invention to provide a tape unit which automatically commences to operate when the cassette housing is moved into operating position with a cassette properly positioned thereon.

These and other objects of the present invention are realized in a specific illustrative embodiment which includes a tape unit having a frame and a housing movably mounted on the frame for holding the cassette. The housing is movable between a loading position for receiving the cassette and an operating position for enabling recording on and reading from the cassette tape. A recording head is rigidly mounted in the housing so as to engage the cassette tape when the cassette is inserted therein. When the housing, including a cassette properly positioned therein, is moved into operating position, presence of the cassette automatically actuates a switch which may be utilized to initiate operation of the tape unit.

DESCRIPTION OF THE DRAWINGS

The above and other objects and advantages of the present invention will become more apparent from the following detailed description made in connection with the accompanying drawings in which.

DETAILED DESCRIPTION

Figures 1, 2, 3, 4:
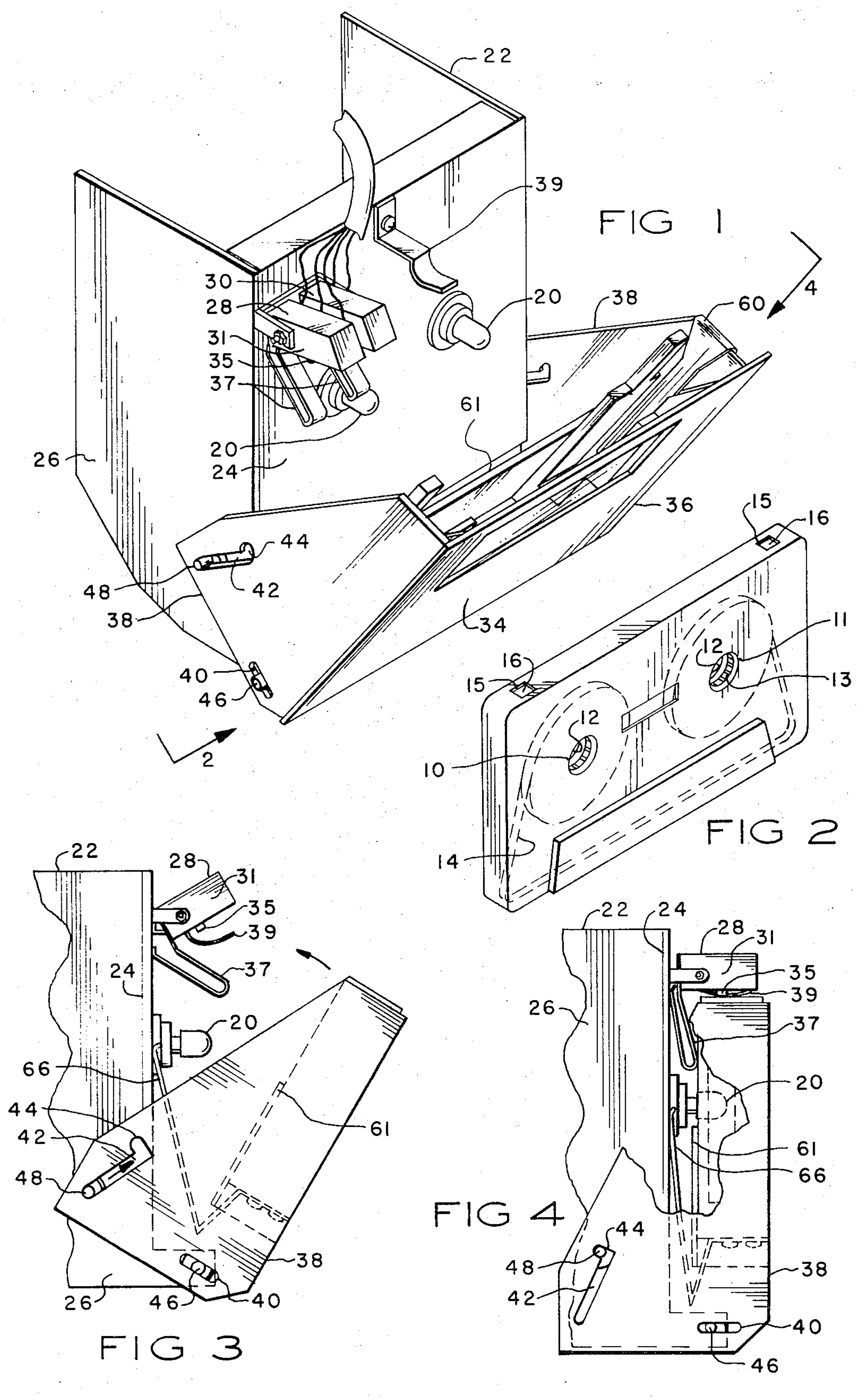
FIG. 1 is a perspective view showing an illustrative embodiment of a tape unit including cassette holding and positioning apparatus made in accordance with the present invention.
FIG. 2 is a perspective view showing a typical cassette.
FIG. 3 is an elevational side view of the apparatus in the loading position looking in the direction of arrow 2 in FIG. 1.
FIG. 4 is an elevational side view of the apparatus in the operating position looking in the direction of arrow 2 in FIG. 1.

FIGS. 1 and 3 through 7 show several views of an illustrative embodiment of a tape unit or tape transport made in accordance with the principles of the present invention. Such a unit may be mounted in a cabinet containing other similar tape units or other apparatus associated, for example, with a computer. The tape unit is particularly adapted for use with a tape cassette such as that shown in FIG. 2. A cassette of this type generally includes a flat, rectangular housing fabricated of a plastic material and having the approximate dimensions: 4 × 2½ × ⅜ inch. The cassette includes two tape spools 10 and 11 (FIG. 2) which are rotatably mounted within the housing about spaced openings 12, with the spools having axial bores exposed through the openings for driving engagement by respective drive hubs 20 of the tape unit (FIG. 1). Six integral, radially inward directed teeth 13 are equally spaced within the spool axial bore for engagement by a driving hub. The tape and its path are illustrated within the cassette by means of broken lines 14; and it will be seen that the tape 14 traverses a path adjacent to the bottom edge of the cassette in its movement from one spool to the other. The top edge of the cassette housing includes two rectangular shaped perforations 15, each located near a different side edge of the cassette housing. The perforations each define a tape 16 which may be punched out of the perforation to enable the insertion in the resulting slot (known as a "file-protect" slot) of a finger-like structure. Before inserting the cassette in a tape unit, one such tab is punched out to enable the user to identify the orientation of the cassette in the tape unit. Furthermore, tape units include apparatus which keys off the punched-out perforation to prevent operation of the unit unless the cassette is properly oriented.

The tape unit embodiment of FIGS. 1 and 3 through 7 of the drawings includes a base frame 22 which supports the other elements to be described and which is configured to be mounted in a cabinet with other equipment as indicated earlier. The frame 22 includes a front plate 24 which is oriented in a vertical plane as illustrated in the drawings, and two side plates 26 for mounting the frame 22. The front plate 24 supports the drive spindles 20 for the spools of the cassette and two switches 28 and 30 to be described later. The spindles 20 and spindle assemblies associated therewith may be any of the types well-known in the prior art suitable for use with a cassette of the type shown in FIG. 2. The frame 22 may also support drive means and associated control circuitry which are now described herein.

A cassette housing 34 is mounted on the frame 22 to enable movement of the housing between an open or loading position illustrated in FIG. 3 and a closed or operating position illustrated in FIG. 4. The housing 34 includes a rectangular front plate 36 and two trapezoidal-shaped side plates 38 spaced near either side thereof and extending perpendicularly therefrom. The side plates 38 and the front plate 36 are affixed to longitudinal members 52 best seen in FIGS. 5 through 7 (to be discussed later).

Each side plate 38 has an elongated opening 40 located near the bottom portion of the plate and near the front plate 36. The opening extends in a direction parallel to the bottom edge of the side plates 38. Each side plate 38 also has an elongated opening 42 extending in a direction substantially parallel with the front plate 36. The opening 42 has a short extension 44 at the upper end thereof directed at right angles thereto and generally away from the front plate 36. Each opening 40 circumscribes a cylindrical pin 46 affixed to and extending outwardly from a side plate 26 of the frame 22 so that the side walls of the opening 40 slidably engage the outer surface of the pin 46. Each opening 42 similarly circumscribes a cylindrical pin 48 affixed to and extending outwardly from a side plate 26 of the frame 22 so that the side walls of the opening 42 slidably engage the outer surface of the pin 48. Thus, in the configuration shown in the drawings, each pair of pins 46 and 48 provide support for the cassette housing 34. Movement of the housing on the pins will be described later.

Figure 6:
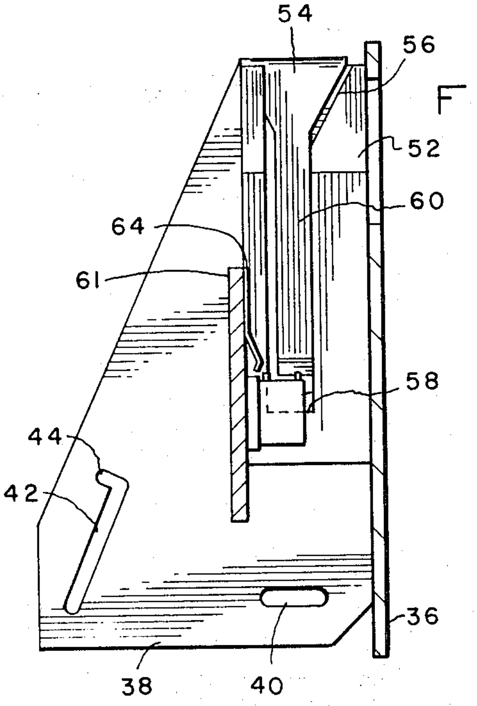
FIG. 6 is a sectional elevational view of the apparatus looking in the direction of arrow 2 in FIG. 1; and, FIG. 7 is a sectional elevational view of the apparatus looking in the direction of arrow 7 in FIG. 5.
Figure 5:
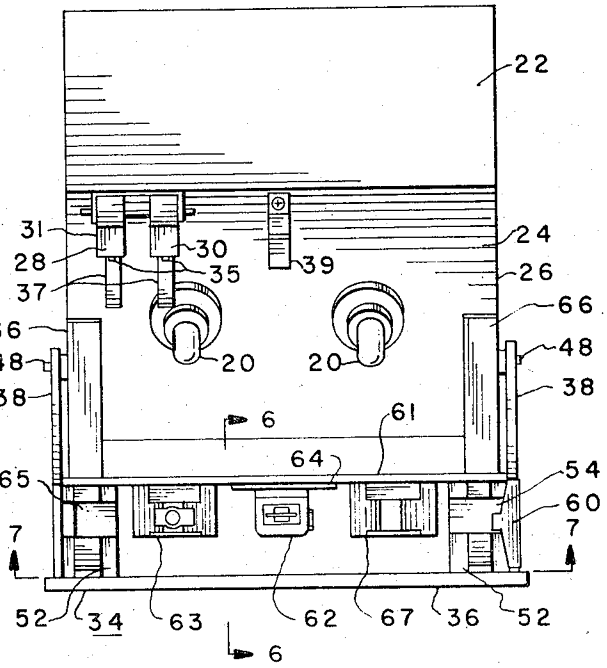
FIG. 5 is a top view of the apparatus looking in the direction of arrow 4 in FIG. 1.
Figure 7:
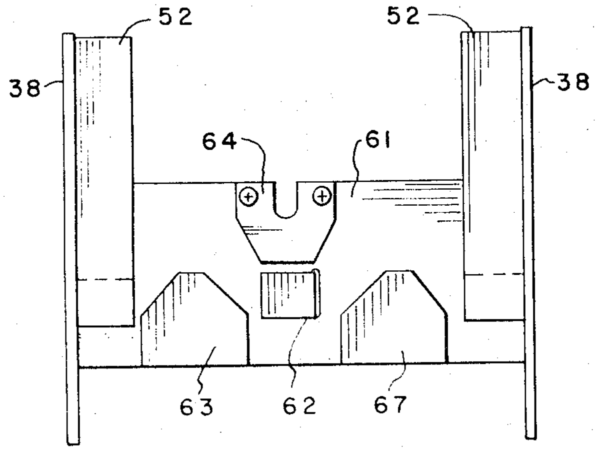

The elements of the cassette housing 34 for receiving and supporting the cassette are best seen in FIGS. 5, 6 and 7. These elements include the two longitudinal members 52, each affixed to the inner wall of a different one of the side plate 38 and to the front plate 63. Each member 52 has a longitudinal groove 54 extending in a direction parallel to the side plates 38 and the front plate 36. The inner surface of each groove substantially conforms in dimension and shape to the outer surfaces of the cassette side edges and is positioned facing the corresponding groove in the opposite member. Each groove is in a spaced relationship with the other so as to enable sliding the cassette side edges longitudinally into the grooves, the corresponding front and back side walls of the grooves defining two vertical planes within which the cassette is constrained. The upper portion 56 of the front side wall of each groove slopes outwardly toward the front plate 36 providing a partially funnel-shaped opening into the groove to guide the bottom edge of the cassette into the grooves. At the lower end of each groove, is an end wall or stop 58 which defines a horizontal plane for supporting the lower edge of the cassette and for limiting downward movement of the cassette. The supporting plane is open between the members 52, as best seen in FIGS. 5 and 7, to provide access to the lower edges of the cassette for components such as a magnetic recording and read head 62, a detector unit 63 and a tape guide 67, all of which will be discussed later.

The cassette housing 34 also includes a resilient longitudinal leaf spring 60 mounted on the wall of one of side plates 38. One end of the spring 60 is affixed to a side plate 38 at its upper portion thereof. The other end of the leaf spring 60 extends downwardly from the point at which it is affixed into one of the grooves 54 along the groove's bottom wall to define a vertical lateral plane for confining a side edge of the cassette. When the cassette is inserted in the grooves 54, the spring 60 engages a side edge of the cassette and urges it laterally against a fixed guide or reference surface 65 located on the opposite longitudinal member thereby preventing lateral movement of the cassette.

The cassette housing 34 further includes a rectangular back plate 61 mounted on the surfaces of the members 52 nearest the front plate 24 of the frame 22. The recording head 62, tape guide 67 and detector unit 63 are mounted near the lower edge of the back plate 61 and generally in the plane defined by the end walls 58 of the grooves 54 as best seen in FIG. 7. As a cassette is inserted in the cassette housing 34 (with the bottom edge of the cassette being inserted first), the recording head 62 is partially received in a recess provided in the bottom edge of the cassette to enable engagement of the head with the cassette tape. Since the recording head 62 is fixed in the cassette housing structure and is positioned to meet and engage the tape without moving the recording head 62, consistent alignability of the head with the tape can be achieved over long periods of time.

The configuration described permits the recording head 62, detector unit 63 and tape guide 67 to be rigidly mounted and thus fixed in alignment relative to the cassette housing 34, and therefore relative to an inserted cassette. The detector unit 63, tape guide 67 and the record head 62 thus serve to properly align the tape in spite of possible dimensional variations in cassettes. It is to be understood that this fixed and rigid alignment is an operational consideration and is not to preclude movable or adjustable construction that permit dimensional tolerances typical of machining and fabrication to be minimized during initial construction or subsequent realignment.

The detector unit 63 may be a unit having a light detector to produce a signal in response to the passage of different forms of tape, for example, to stop the tape drive. The position of the detector unit 63 preferably also facilitates consistent alignability of the unit 63 with the tape in the cassette by incorporating a rectangular grove that serves to edge guide the tape. The tape guide 67 is similarly configured for tape guiding except that the detector is not incorporated.

For limiting frontward and backward motion of the cassette when it is inserted in the housing 34, a longitudinal leaf spring 64, as best seen in FIGS. 5, 6 and 7, is provided. The upper end of the leaf spring 64 is attached to the upper central portion of the back plate 61 and the lower portion of the spring 64 extends downwardly and toward the front plate 36. When a cassette is inserted in the housing 34, the lower portion of the leaf spring 64 engages the back wall of the cassette urging the front wall of the cassette against the front side walls of the grooves 54, thereby preventing forward and backward movement of the cassette in the housing 34.

A pair of resilient leaf springs 66 are utilized to maintain the cassette housing 34 in both the loading and operating position. One end of each spring 66 is affixed to the bottom surface of a member 52—one spring being affixed to one member and the other spring being affixed to the other member. Each spring extends downwardly and toward the frame 22 for a short distance and then curves upwardly and toward the frame 22 until the surface of the spring normal to the direction of the curve engages the front plate 24 of the frame 22. When the cassette housing 34 is in the loading position, as illustrated in FIG. 3, the springs 66 exert a pressure against the front plate 24 and, therefore, a corresponding pressure against the bottom surfaces of members 52 forcing the upper portion of the housing outwardly and downwardly from the frame 22 in a pivotal attitude about pins 46. The abutting of the pins 48 against the lower end of the openings 42 prevent the housing 34 from pivoting about the pins 46 beyond a certain predetermined position. When the cassette housing 34 is in the operating position, as illustrated in FIG. 4, the springs 66 again exert a pressure against the front plate 24 of the frame 22 and a corresponding pressure against the bottom surfaces of members 52 tending to force the bottom portion of the housing 34 outwardly from the frame 22. This, in turn, forces the closed end of the extension 44 of the opening 42 against the pins 48 thereby securing the housing in the operating position.

The two switches 28 and 30, mentioned earlier provide for detecting when the cassette housing 34 is moved into the operating position with a cassette inserted therein in the proper orientation. Each switch comprises an elongated block-shaped housing 31, one end of which is hingedly mounted on the front plate 24 of the frame 22. Extending from inside each housing 31 through an opening in the lower surface thereof is a short finger or nipple 35 which, when a sufficient force is applied at the end of the nipple in the direction of the housing 31, will be forced into the housing, and when the force is removed, will again extend to its full length out of the housing. When the nipple of switch 30 is forced into the housing, the switch is replaced in an operated or actuated state. The reason for these switch operations will be discussed later.

Two resilient leaf springs 37 are each attached to a different one of the switches 28 and 30 to maintain the switch housings 31 pivoted upwardly from the horizontal about the hinge axes when the cassette housing 34 is in the loading position (FIG. 3) and to engage the back wall of the cassette and cause the switch housings 31 to pivot downwardly to a substantially horizontal position when the cassette housing 34 with a cassette inserted therein is moved into the operating position (FIG. 4). One end of each leaf spring 37 is affixed to the hinged end of a different one of the switch housings 31 and extends downwardly and away from the front plate 24 of the frame 22 and then curves under and doubles back upwardly and toward the front plate 24 to slidingly engage the front plate 24.

The operation of the tape unit illustrated in FIGS. 1 and 3 through 7 will now be briefly reviewed. Assume that the cassette housing 34 is in the operating position as illustrating in FIG. 4 and that it is desired to place the housing 34 in the loading position. To move the housing 34 into the loading position, a force is applied at the lower portion of the front plate 36, directed toward the frame 22. This forces the lower portion of the housing 34 toward the frame 22 causing the openings 40 to slide longitudinally about the pins 46 and causing the extension 44 of the opening 42 to slide about the pins 48 to a position in which the pins 48 are positioned just below the elbow of the extension 44 in the opening 42. In this position, the springs 68 cause the cassette housing 34 to pivot about pins 46 so that the upper portion of the housing swings outwardly and downwardly from the frame 22 into the loading position, as illustrated in FIG. 3.

A cassette is inserted into the cassette housing 34 with the edge having the recording head recess facing downward. The cassette's side edges slide along the side walls of the groove 54 until the bottom edge of the cassette engages the end walls 58 of the grooves. The bottom edge of the cassette is then accurately positioned relative to the recording head 62 which has been received in the bottom edge cassette recess, and relative to the detector unit 63. The cassette is firmly held in this position by the leaf spring 60 which engages one side edge of the cassette and a leaf spring 64 which engages the back wall of the cassette forcing the cassette against the front side walls of the grooves 54. It is important to note that the cassette would normally be grasped by an operator at a location away from the exposed magnetic tape, minimizing the possibility of tape contamination.

After the cassette is in place in the cassette housing 34, the upper portion of the cassette housing is urged toward the front wall 24 thereby causing the openings 42 to slide longitudinally about the pins 48 until the pins are positioned at the elbows of extension 44 of the openings 42. At this position, the leaf springs 66 force the lower portion of the cassette housing 34 outwardly from the front plate 24 causing the end wall of the extension opening 44 to engage the pin 48 thereby securing the cassette housing 34 in the operating position.

As the upper portion of the cassette housing is being moved toward the front plate 24, the drive hubs 20 are partially received within the cassette openings; and the upper portion of the back wall of the cassette engages the leaf springs 37 of the switches 28 and 30 causing the switch housings 31 to pivot downwardly toward the top edge of the cassette. As the housing 31 of switch 28 is pivoted downwardly, the nipple 35 of the switch 28 will slip into the file-protect slot of the cassette if the tab has been removed therefrom and if the cassette is properly oriented (i.e. not turned around), in the cassette housing. Further, as the housing 31 of switch 30 pivots downwardly, the nipple 35 of the switch 30 will engage the top edge of the cassette compressing the nipple into the housing. With the nipple of switch 28 extended and the nipple of switch 30 compressed, both switches are in the actuated or operative state as indicated earilier. The switches 28 and 30 are connected to other control circuitry of the tape unit to thereby initiate either the record or playback operation of the unit when both switches are operated.

If either the cassette is improperly oriented in the cassette housing 34 (i.e. turned around), or the tab 16 has not been removed from the perforation 15 (FIG. 2), then, upon urging the cassette housing into the operating position, the nipple 35 of the switch 28 will be forced into the switch housing by the tab 16 causing the switch 28 to assume an unoperated or unactuated condition. This would provide an indication to the control circuitry that the tape unit is not to be operated in the recording mode (thus protecting the data file). Also, if the cassette housing 34 is placed in the operating position but the housing 34 does not contain a cassette, then the nipple 35 of the switch 30 will remain extended and thus the switch 30 will be in the unactuated or unoperated state. This also provides an indication to the control circuitry that the tape unit is not to be operated. Thus, the switches 28 and 30 provide an indication to the tape unit control circuitry when a cassette is inserted in the cassette housing 34 in the proper orientation and thus provide for automatically initiating operation of the tape unit.

Removal of the cassette from the cassette housing 34 is carried out simply by placing the cassette housing in the loading position and removing the cassette therefrom.

Although the invention has been described with reference to a particular preferred embodiment, changes and modifications will become apparent to those skilled in the art in view of the foregoing description which is intended to be illustrative and not limiting of the invention defined in the claims.

What is claimed is:

1. A tape unit for use with a rectangular tape cassette comprising
- a frame,
- a holding means movably mounted on said frame for receiving and holding the cassette, said holding means being movable between a loading position for enabling the loading of the cassette therein and an operating position for enabling recording on and reading from the cassette tape,
- a recording head mounted on said holding means for engagement with the tape transported adjacent to the bottom edge of the cassette, when the cassette is placed in said holding mean,
- a first switch means mounted on said frame responsive to engagement with a cassette placed in said holding means when said holding means is in said operating position for assuming an actuated state, and responsive to disengagement with the cassette when said holding means is not in said operating position for assuming an unactuated state, and
- a second switch means mounted on said frame to pivot from a first position when the holding means is in said loading position to a second position in response to the holding means being moved to said operating position, said second switch means including a compressible nipple which when fully extended, assumes an actuated state and, when compressed, assumes an unactuated state, said nipple being positioned to fully extend into a file protection slot of a cassette properly placed in said holding means when the slot tab is removed from the cassette and said second switch means is in said second position and to compress upon engagement with a slot tab of a cassette placed in said holding means when the slot tab remains in the file protection slot and said second switch means is in said second position.

2. A tape unit for use with a rectangular tape cassette comprising:
- a frame,
- a pair of spindles mounted in said frame,
- a holding means movably mounted on said frame for receiving and holding the cassette, said holding means being movable between a loading position for enabling the loading of the cassette therein and an operating position for enabling recording on and reading from the cassette tape, the axial bores of the cassette loaded in the holding means receiving said spindles as the holding means is moved to the operating position, said holding means including
  - two side members movably mounted to said frame each of said side members including therein a longitudinal groove whose inner surface substantially conforms in dimension and shape to the outer surface of a cassette side edge and which is positioned parallel to and facing the corresponding groove in the other side member, said grooves being in spaced relationship so as to enable sliding each cassette side edge longitudinally into a respective groove,
  - a plate affixed to and interconnecting said side members, and
  - means mounted on said interconnecting plate for engaging the cassette wall nearest the frame when the cassette is inserted in said groove to thereby urge the opposite cassette wall in a direction away from said frame and into engagement with the side walls of said grooves, and
- a recording head mounted on said holding means for engagement with the tape transported adjacent to the bottom edge of the cassette when the cassette is placed in said holding means.

3. A unit as in claim 2 wherein each of said side members further includes support means located at one end of the groove of the side member and which defines, in conjunction with the support means of the other side member, a plane for supporting and positioning the lower edge of the cassette when the cassette is inserted in said grooves.

4. A unit as in claim 3 further including means mounted on said frame for engaging the cassette top edge when the cassette is inserted in said holding means and when said holding means is in said operating position to thereby urge the cassette bottom edge into engagement with said support means.

5. A unit as in claim 3 wherein each of said side members further includes means located in the groove of the side member for engagement with a cassette side edge for lateral positioning of the cassette.

6. A unit as in claim 5 wherein at least one of said lateral positioning means includes a leaf spring one surface of which engages and positions a cassette side edge.

* * * * *